(12) United States Patent
Buckland et al.

(10) Patent No.: US 6,618,399 B1
(45) Date of Patent: Sep. 9, 2003

(54) SYSTEM AND METHOD FOR ELIMINATING JITTER BY USING A STARVE/INSPECT APPROACH TO AAL1

(75) Inventors: Kenneth M. Buckland, Santa Rosa, CA (US); Barry W. Field, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/428,303

(22) Filed: Oct. 27, 1999

(51) Int. Cl.[7] .................................................. H04J 3/06
(52) U.S. Cl. ....................... 370/516; 370/505; 370/506
(58) Field of Search ........................ 370/395.6, 395.61, 370/395.62, 516, 517, 519, 505, 506; 375/372

(56) References Cited

PUBLICATIONS

"Integrated Services Digital Network (ISDN) Overall Network Aspects and Functions B–ISDN ATM Adaptation Layer (AAL) Specification," ITU–T Recommendation 1.363, *International Telecommunication Union*, Mar., 1993.

"Circuit Emulation Service Interoperability Specification Version 2.0," af–vtoa–0078.000, *The ATM Forum Technical Committee*, Jan., 1997.

"Voice and Telephony Over ATM to the Desktop Specification," af–vtoa–0083.000, *The ATM Forum Technical Committee*, May, 1997.

*Primary Examiner*—Douglas Olms
*Assistant Examiner*—Robert W. Wilson
(74) *Attorney, Agent, or Firm*—Baker Botts L.L.P.

(57) ABSTRACT

A system and method for transporting telephony signals across an ATM network using AAL1 while eliminating the jitter associated with the AAL1 cells. The present invention uses starve/inspect techniques to dynamically buffer the ATM frames such that jitter associated with the cells can be reduced while avoiding unneeded buffering that would cause excessive delay.

25 Claims, 2 Drawing Sheets

SYSTEM AND METHOD FOR ELIMINATING JITTER BY USING A STARVE/INSPECT APPROACH TO AAL1

TECHNICAL FIELD OF THE INVENTION

This invention relates to the field of telephony using ATM networks and more particularly to techniques for processing telephony signals communicated over ATM networks using ATM Adaptation Layer 1 (AAL1) telephony.

BACKGROUND OF THE INVENTION

Asynchronous transfer mode (ATM) is an approach to communicate data in fixed packets or cells. ATM Adaptation Layer 1 (AAL1) is used to carry telephony traffic through an ATM network using ATM cells. In order to transport the analog telephony signal across an ATM network, the telephony signals at the source of the transmission are digitized by sampling the analog signals at regular intervals. For example, 8-bit digital samples of a voice signal may be sampled at regular 125 $\mu$s (8 kHz) intervals. The digital information corresponding to the analog signal may then be packed into ATM cells and transported to the destination across the ATM network.

After the cells arrive at the destination, the information contained in the cells is extracted to form frames. Within an AAL1 data stream, telephony traffic is carried in "frames." Each frame is the complete set of 8-bit digital samples that are collected during a single 125 $\mu$s period for all of the voice channels (DS-0s) being carried within the AAL1 stream. Frames may or may not overlap exactly with the 47 (sometimes fewer) byte payload of an AAL1 cell. In order to reproduce the transmitted telephony signal at the destination, the frames storing the recurrent sequence of samples are converted back to an analog signal.

As the cells carrying the telephony signal pass through the ATM network, they encounter variable delay, or "jitter." Jitter results due to dynamically changing buffer fullness in the ATM switches on the AAL1 cell path, which is in turn due to the presence of other ATM traffic in these switches. Accordingly, jitter causes ATM cells to arrive at irregular intervals at the receive end of the network. Jitter is not acceptable because it prevents proper reconstruction, at regular intervals, of the analog signal. All of the different variants of AAL1 suffer from jitter problems. Consequently, in order for telephony traffic to be transported using AAL1, the jitter associated with ATM AAL1 cells needs to be eliminated.

Conventional approaches attempt to reduce or eliminate jitter by using various buffering schemes. The level of buffering used by these schemes is based on the overall jitter conditions in the ATM network. However, since the jitter conditions associated with the cells are unknown and variable, in order to use these buffering techniques, a computationally difficult algorithm is typically employed to perform network jitter analysis to determine the optimal buffering level for the network. This process is usually time consuming and expensive. Typically this algorithm is employed at the receive end of the communication.

Thus, there is a need for techniques which can remove jitter associated with AAL1 telephony traffic without having to perform complex network analysis and which can be adapted to changing network conditions.

SUMMARY OF THE INVENTION

The present invention provides techniques for removing jitter associated with ATM cells transported using AAL1. In one embodiment, a starve/inspect buffering technique is used to remove jitter while avoiding unneeded buffering that would cause excessive delay.

According to one aspect of the present invention, a first-in-first-out (FIFO) buffer is provided for queuing the frames containing data extracted from the AAL1 cells. Frames are written to the tail of the buffer and can be read from the head of the buffer for processing purposes. When buffer starvation occurs because of jitter associated with the AAL1 cells, a replacement frame may be inserted into the buffer and made available to the reader. This increments the average buffer fullness level which can be dynamically increased if jitter conditions increase.

According to another aspect of the present invention, when the jittered cells arrive, the frames corresponding to the jittered cells are inserted into the buffer after the replacement frames. The jittered frames may then be read and processed in subsequent time periods.

According to another aspect of the present invention, an "inspect" approach is used to minimize the increases in the average fullness level of the FIFO, which may result due to infrequent and unusually long jitter. In one embodiment, the present invention maintains a minimum buffer level indicator to keep track of the minimum buffer fullness level for a given time period. The present invention then determines if the minimum buffer fullness level has an optimum value after an observation time period. In one embodiment, the optimal value is zero. If the minimum buffer level indicator has a value higher than the optimal value, then according to the present invention, frames are slipped or removed from the buffer. This reduces the average buffer fullness of the buffer which counteracts creep. Other technical advantages are readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figure 1:
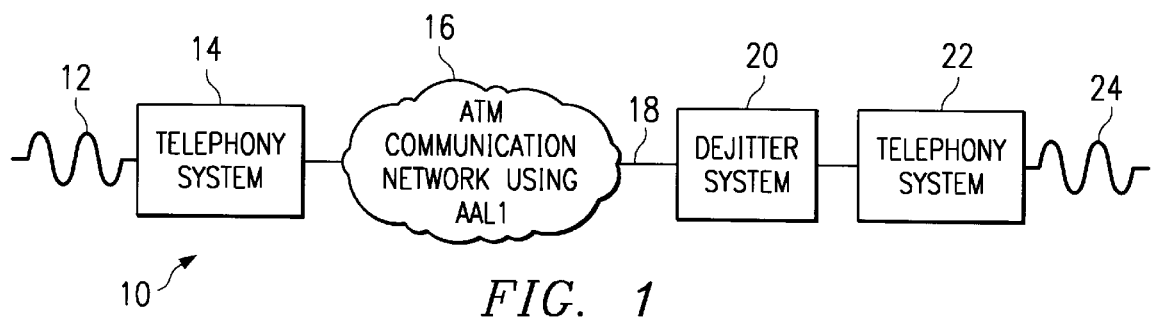
FIG. 1 is a simplified block diagram depicting a network environment for transferring telephony signals via an ATM network using AAL1 according to an embodiment of the present invention.

FIG. 1 depicts a network environment 10 incorporating the present invention. Network environment 10 facilitates transfer of telephony signals from telephony system 14 to telephony system 22 via ATM network 16 using AAL1. Telephony system 14 converts multiple analog telephony signals 12 to ATM AAL1 cells which are then communicated via ATM network 16 to destination telephony system 22. Telephony system 14 digitizes analog signals 12 by sampling analog signal 12 at regular time intervals. For example, 8-bit digital samples of analog signals 12 are sampled at regular 125 $\mu$s (8 kHz) intervals. The digital information corresponding to analog signals 12 are then packed into ATM cells and transported to destination telephony system 22 via ATM network 16 using AAL1.

As the ATM cells pass through ATM network 16, they experience jitter or delay which causes the cells to arrive at irregular intervals at the receiving port/end 18 of ATM network 16. As previously stated, jitter introduces errors in the reconstruction of the analog signal from the digital information stored in the ATM cells at the receiving end. In order to reduce the effects of jitter, the ATM cells are first filtered through dejitter system 20 before being forwarded to telephony system 22 for analog conversion. Dejitter system 20 is responsible for extracting the digital information stored in the ATM cells into frames and buffering the frames so as to remove jitter while minimizing the delay introduced by the buffering.

Figure 2:
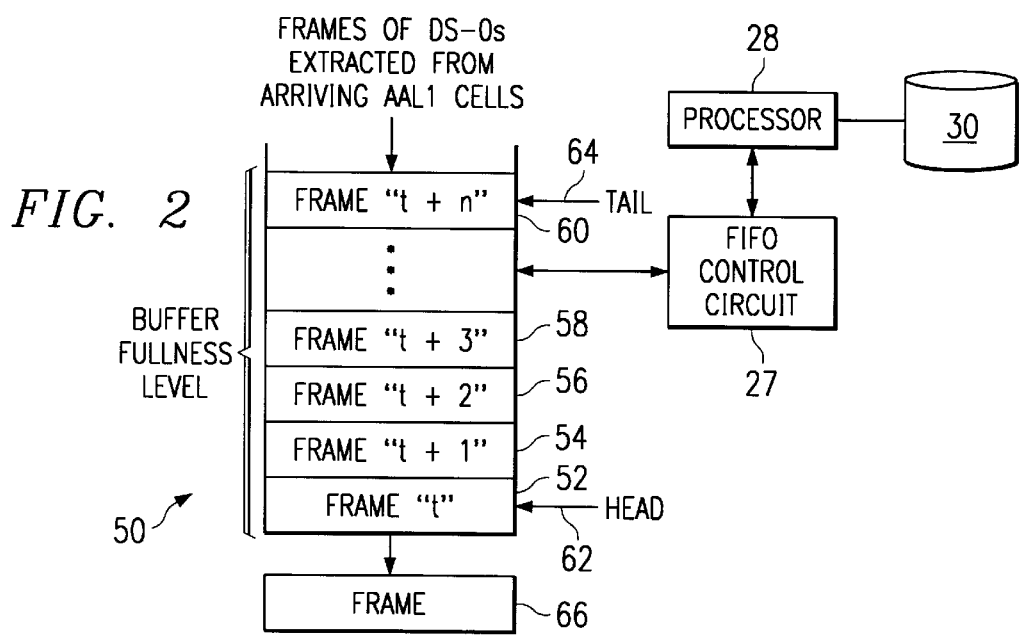
FIG. 2 depicts a FIFO buffer according to an embodiment of the present invention.

The jitter effects associated with the AAL1 cells are reduced by using a buffering technique that incorporates a unique starve/inspect approach. The frames that arrive at dejitter system 20 in cell payloads at the AAL1 SAR layer are controllably buffered in a first-in-first-out (FIFO) buffer to remove jitter. FIG. 2 depicts a FIFO buffer 50 of dejitter system 20 that provides a queuing mechanism for storing a plurality of frames, for example, 125 µs frames 52, 54, 56, 58, and 60, each composed of a fixed number of DS-0 samples. A tail pointer 64 indicates the location of the last or latest frame within buffer 50. Frames 52, 54, 56, 58, 60 are extracted from ATM AAL1 cells as they arrive at dejitter system 20 and are written to the tail of buffer 50.

A head pointer 62 indicates the location of the first or earliest frame within buffer 50. Since buffer 50 is a FIFO, head pointer 62 also points to the next frame available to be read from buffer 50. For example, the head of buffer 50 indicated by head pointer 62 contains frame 52. Frame 66 represents a frame which has been read from the head of buffer 50 for processing. Frames are read from buffer 50 by telephony system 22. Buffer 50 can be implemented in a variety of ways, such as using circular buffer format, using link-listed pointers, or by using other techniques known to those of ordinary skill in the art.

A FIFO control circuit 27 manages the head and tail pointers, as well as other FIFO calculations. These include buffer fullness level and minimum buffer fullness level. FIFO control circuit 27 operates under the supervision of a processor 28 which controls dejitter system 20. Processor 28 couples to a memory 30, which may be integral or separate volatile or non-volatile storage. Memory 30 maintains program instructions and data accessible by processor 28 to control the operation of dejitter system 20.

In one embodiment, a frame is regularly read by telephony system 22 from the head of buffer 50 at 125 µs intervals for conversion of the digital signal back to an analog telephony signal. Starvation occurs when AAL1 cells are delayed due to jitter and buffer 50 has no frames to offer to telephony system 22 when required. In order to prevent such starvation, the frames containing the DS-0 channels are buffered for an average time period corresponding to their maximum jitter "J," wherein "J" is rounded up to an integer. In one embodiment, "J" is rounded to an integer number of 125 µs frame periods. For example, a "J" with a value of "2" indicates a maximum jitter of 250 µs frame periods. Given maximum jitter "J," the required level of FIFO buffering can be determined as (2* J)+1 frames, where the extra frame is used to hold the DS-0s being output to telephony system 22 in the current frame period.

However, as previously stated, the value of "J" is unknown and variable for any incoming frame. Accordingly, it is not possible to deterministically set the initial fill level of buffer 50 or the average fullness level of buffer 50 without performing complex network analysis.

Dejitter system 20 solves the above problem by eliminating the need to determine a maximum jitter "J" value. FIFO control circuit 27 initializes buffer 50 to empty and initializes the tail 64 and head 62 pointers to the same empty buffer location. When telephony system 22 expects to read a frame from the head of buffer 50 and no frames are available to be read, the FIFO control circuit 27 configures a replacement frame which is passed to telephony system 22 as a replacement for the missing DS-0 frame. In one embodiment, the replacement frame may be made up of all "1"s type DS-0s or alternatively DS-0s from a previous frame.

When the jittered cell (or cells) subsequently arrives, the frame containing the DS-0s content for the jittered cell(s) is then loaded into buffer 50 and read by telephony system 22 in subsequent 125 µs frame periods. As a result, there is a "frame slip" that adds a single frame (or more) to the average buffer fullness level. In this manner, the average buffer fullness level can be set and thereafter increased if the jitter conditions increase. The insertion of replacement frames enables telephony system 22 to perform the digital to analog conversion without being affected by the jitter associated with the incoming AAL1 cells.

A side-effect of the above described starvation based approach is that infrequent and unusually long jitter induced delays can result in the average buffer fullness level being increased to buffer levels beyond an appropriate or necessary level. More specifically, unusually long delays may result in prolonged starvation of buffer 50, followed by a large burst of the delayed cells. This cell "clumping" increases the average buffer fullness because the frames are read out of the buffer at a deterministic rate regardless of the ingress cell rate. This problem of "creep" can cause excessive and unnecessary delay through buffer 50.

In order to reduce creep, dejitter system 20 maintains a minimum buffer fullness indicator which indicates the minimum buffer fullness level value for a given time period. Proccessor 28 monitors the buffer fullness level of buffer 50 at regular time intervals.

Figure 3:
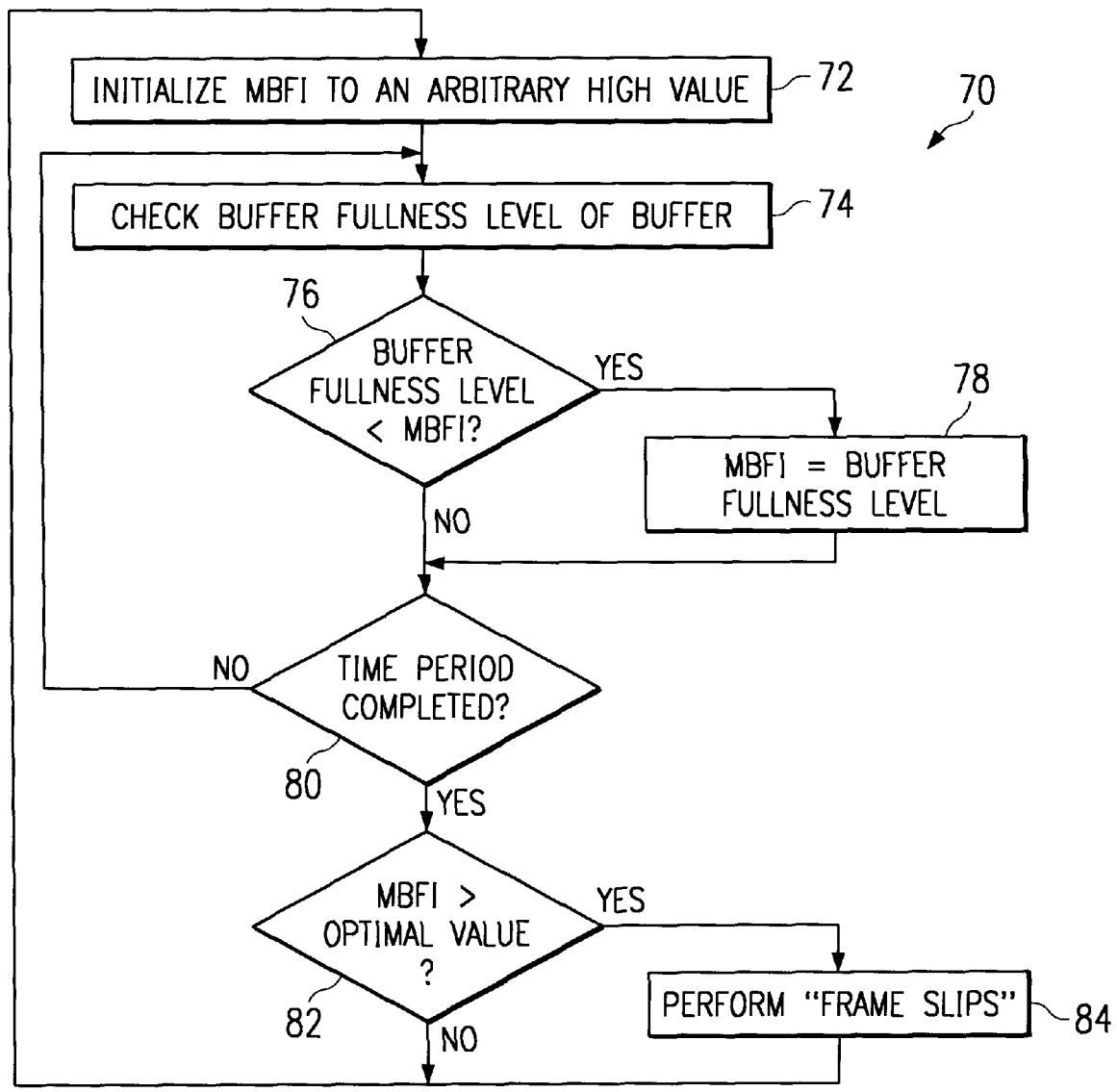
FIG. 3 is a flowchart depicting steps performed by a buffer processing system to minimize creep according to an embodiment of the present invention.

FIG. 3 is a flowchart 70 depicting steps performed by processor 28 in conjunction with FIFO control circuit 27 to minimize creep. Specifically, processor 28 initializes the minimum buffer fullness indicator (MBFI) in FIFO control circuit 27 to an arbitrary high value, for example, a value larger than the required buffer size (step 72). Subsequently, each time it outputs a frame, FIFO control circuit 27 checks the buffer fullness level of buffer 50 (step 74). FIFO control circuit 27 then determines if the buffer fullness level value determined in step 74 is lower than the value indicated by the minimum buffer fullness level indicator (step 76). If the buffer fullness level determined in step 74 is lower than the value indicated by the minimum buffer fullness level indicator, the minimum buffer fullness indicator is set to the value determined in step 74 (step 78). Processor 28 then determines if the predetermined inspection time period has been completed (step 80). If not, the buffer fullness level is repeatedly monitored at step 74. In this manner, the minimum buffer fullness level is monitored over a period of time using the minimum buffer level indicator.

If the predetermined time period has completed, processor 28 then inspects the value of the minimum buffer fullness indicator (step 82). Optimally, the minimum buffer fullness indicator should have a value of zero (given a long enough sampling interval). A minimum buffer fullness indicator value of greater than zero indicates that buffer 50 is buffering more frames than required to eliminate the jitter, thus resulting in unnecessary delay through buffer 50. In response, processor 28, using the FIFO control circuit 27, forces one or more frames to be skipped from the head of buffer 50 (step 84). The skipping of frames is generally done one at a time, in an orderly manner, over a reasonable period of time. This in effect reduces the average buffer fullness level to appropriate levels and minimizes creep. The process may then be restarted for another time period at step 72.

As described above, by combining starvation and inspection based approaches, dejitter system 20 facilitates an overall "starve/inspect approach" to AAL1 dejittering. Unlike other AAL1 approaches, no calculations have to be performed using network traffic characteristics in order to determine ahead of time how to configure the AAL1 dejittering system.

Although specific embodiments of dejitter system 20 have been described, various modifications, alterations, alternative constructions, and equivalents are also encompassed within the scope of this application. For example, the structure of buffer 50 is not limited to the embodiment shown in FIG. 2. Alternate configurations of buffer 50 having more or less subsystems than the embodiment depicted in FIG. 2 are also within the scope of the present invention. In other embodiments, the subsystems of buffer 50 may be combined into one or more subsystems or with other network systems. Further, the names given to the subsystems do not in any way limit the functional scope of the subsystems.

The described invention is not restricted to operation within certain specific data processing environments, but is free to operate within a plurality of data processing environments. Additionally, although the present invention has been described using a particular series of transactions and steps, for example, the flowchart depicted in FIG. 3, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations of hardware and software.

What is claimed is:

1. In a communication network for communicating ATM traffic using AAL1, a method for reducing jitter associated with AAL1 cells while minimizing delay, the method comprising:

providing a first-in-first-out buffer for buffering frames containing data extracted from the AAL1 cells, the buffer having a first port for writing frames to the buffer and a second port for reading frames from the buffer;

providing a reader for reading frames from the second port at regular time intervals; and when a frame is not available to be read from the buffer by the reader, inserting at least one replacement frame into the buffer and making the replacement frame available to be read by the reader, through the second port of the buffer.

2. The method of claim 1, wherein the at least one replacement frame comprises data contained in a previous frame.

3. In a communication network for communicating ATM traffic using AAL1, a method for reducing jitter associated with AAL1 cells while minimizing delay, the method comprising:

providing a first-in-first-out buffer for buffering frames containing data extracted from the AAL1 cells, the buffer having a first port for writing frames to the buffer and a second port for reading frames from the buffer;

providing a reader for reading frames from the second port at regular time intervals;

when a frame is not available to be read from the buffer by the reader, adding at least one replacement frame to the buffer and making the replacement frame available to be read by the reader, wherein the at least one replacement frame comprises only binary one values.

4. The method of claim 1, further comprising:

receiving jittered AAL1 cells;

extracting data from the jittered AAL1 cells to form a jittered frame;

adding the jittered frame to the buffer after the replacement frame; and making the jittered frame available to be read by the reader after the replacement frame.

5. In a communication network for communicating ATM traffic using AAL1, a method for reducing jitter associated with AAL1 cells while minimizing delay, the method comprising:

providing a first-in-first-out buffer for buffering frames containing data extracted from the AAL1 cells, the buffer having a first port for writing frames to the buffer and a second port for reading frames from the buffer;

providing a reader for reading frames from the second port at regular time intervals; and when a frame is not available to be read from the buffer by the reader, adding at least one replacement frame to the buffer and making the replacement frame available to be read by the reader;

periodically determining a current fullness level of the buffer and setting a first indicator to the current fullness level if the current fullness level is less than the first indicator value;

comparing the value of the first indicator to an optimal fullness level value; and skipping a first number of frames from the buffer at the second port to reduce the average buffer fullness level value for the buffer when the value of the first indicator is greater than the optimal fullness level value.

6. The method of claim 5, wherein the optimal fullness level value is zero.

7. The method of claim 5, further comprising the step of initially setting the first indicator to a value higher than a size of the buffer.

8. In a communication network for communicating ATM traffic using AAL1, a computer-readable medium containing instructions for reducing jitter associated with AAL1 cells while minimizing delay, the instructions comprising:

instructions for providing a first-in-first-out buffer for buffering frames containing data extracted from the AAL1 cells, the buffer having a first port for writing frames to the buffer and a second port for reading frames from the buffer;

instructions for providing a reader for reading frames from the second port at regular time intervals;

instructions for determining when a frame is not available to be read from the buffer by the reader; and when the frame is not available to be read from the buffer by the reader, instructions for inserting at least one replacement frame into the buffer and making the replacement frame available to be read by the reader, through the second port of the buffer.

9. The computer-readable medium of claim 8, wherein the at least one replacement frame comprises data contained in a previous frame.

10. In a communication network for communicating ATM traffic using AAL1, a computer-readable medium containing instructions for reducing jitter associated with AAL1 cells while minimizing delay, the instructions comprising:

instructions for providing a first-in-first-out buffer for buffering frames containing data extracted from the AAL1 cells, the buffer having a first port for writing frames to the buffer and a second port for reading frames from the buffer;

instructions for providing a reader for reading frames from the second port at regular time intervals;

instructions for determining when a frame is not available to be read from the buffer by the reader; and when the frame is not available to be read from the buffer by the reader, instructions for adding at least one replacement frame to the buffer and making the replacement frame available to be read by the reader, wherein the at least one replacement frame comprises only binary 1 values.

11. The computer-readable medium of claim 8, further comprising:

instructions for receiving jittered AAL1 cells;

instructions for extracting data from the jittered AAL1 cells to form a jittered frame;

instructions for adding the jittered frame to the buffer after the replacement frame; and instructions for making the jittered frame available to be read by the reader after the replacement frame.

12. In a communication network for communicating ATM traffic using AAL1, a computer-readable medium containing instructions for reducing jitter associated with AAL1 cells while minimizing delay, the instructions comprising:

instructions for providing a first-in-first-out buffer for buffering frames containing data extracted from the AAL1 cells, the buffer having a first port for writing frames to the buffer and a second port for reading frames from the buffer;

instructions for providing a reader for reading frames from the second port at regular time intervals;

instructions for determining when a frame is not available to be read from the buffer by the reader; and when the frame is not available to be read from the buffer by the reader, instructions for adding at least one replacement frame to the buffer and making the replacement frame available to be read by the reader;

instructions for periodically determining a current fullness level of the buffer and setting a first indicator to the current fullness level if the current fullness level is less than the first indicator value;

instructions for comparing the value of the first indicator to an optimal fullness level value; and instructions for skipping a first number of frames from the buffer at the second port to reduce the average buffer fullness level value for the buffer when the value of the first indicator is greater than the optimal fullness level value.

13. The computer-readable medium of claim 12, wherein the optimal fullness level value is zero.

14. The computer-readable medium of claim 12, and further comprising instructions for initially setting the first indicator to a value higher than a size of the buffer.

15. In a communication network for communicating ATM traffic using AAL1, a dejitter system coupled to a frame reader for reducing jitter associated with AAL1 cells while minimizing delay, the dejitter system comprising:

a processor;

a memory coupled to the processor, the memory configured to store modules for execution by the processor, the modules including:

a module for providing a first-in-first-out buffer for buffering frames containing data extracted from the AAL1 cells, the buffer having a first port for writing frames to the buffer and a second port from where the frames are read by the frame reader at regular time intervals; and when a frame is not available to be read from the buffer by the frame reader, a module for inserting at least one replacement frame into the buffer and making the replacement frame available to be read by the frame reader, through the second port of the buffer.

16. In a communication network for communicating ATM traffic using AAL1, a dejitter system coupled to a frame reader for reducing jitter associated with AAL1 cells while minimizing delay, the dejitter system comprising:

a processor;

a memory coupled to the processor, the memory configured to store modules for execution by the processor, the modules including:

a module for providing a first-in-first-out buffer for buffering frames containing data extracted from the AAL1 cells, the buffer having a first port for writing frames to the buffer and a second port from where the frames are read by the frame reader at regular time intervals; and when a frame is not available to be read from the buffer by the frame reader, a module for adding at least one replacement frame to the buffer and making the replacement frame available to be read by the frame reader;

wherein the memory of the dejitter system is further configured to store modules including:

a module for periodically determining a current fullness level of the buffer and for setting a first indicator to the current fullness level if the current fullness level is less than the first indicator value;

a module for comparing the value of the first indicator to an optimal fullness level value; and a module for skipping a first number of frames from the buffer at the second port to reduce the average buffer fullness level value for the buffer when value of the first indicator is greater than the optimal fullness level.

17. A networking environment, comprising:

a transmitter configured to convert an analog signal to a corresponding digital signal encapsulated in ATM cells;

an ATM network configured to transport the ATM cells via AAL1;

a dejitter system coupled with the ATM network and configured to extract data from the ATM cells and form corresponding frames;

a receiver coupled with the dejitter system, the receiver configured to read the frames from the dejitter system at regular time intervals and to reproduce the analog signal from the frames;

the dejitter system further configured to provide a first-in-first-out buffer for buffering the frames, the buffer having a first port for writing frames to the buffer and a second port from where the frames are read by the receiver; and the dejitter system further configured to insert at least one replacement frame into the buffer when a frame is not available to be read from the buffer, and to make the replacement frame available to be read by the receiver through the second port of the buffer.

18. A networking environment, comprising:

a transmitter configured to convert an analog signal to a corresponding digital signal encapsulated in ATM cells;

an ATM network configured to transport the ATM cells via AAL1;

a dejitter system coupled with the ATM network and configured to extract data from the ATM cells and form corresponding frames;

a receiver coupled with the dejitter system, the receiver configured to read the frames from the dejitter system at regular time intervals and to reproduce the analog signal from the frames;

the dejitter system further configured to provide a first-in-first-out buffer for buffering the frames, the buffer having a first port for writing frames to the buffer and a second port from where the frames are read by the receiver;

the dejitter system further configured to add at least one replacement frame to the buffer when a frame is not available to be read from the buffer, and to make the replacement frame available to be read by the receiver;

wherein the dejitter system is further configured to determine a current fullness level of the buffer and to set a first indicator to the current fullness level if the current fullness level is less than the first indicator value, to compare the value of the first indicator to an optimal fullness level value, and when the value of the first indicator is greater than the optimal fullness level value, to skip a first number of frames from the buffer at the second port to reduce the average buffer fullness level value for the buffer.

19. The system of claim 15, wherein the at least one replacement frame comprises data contained in a previous frame.

20. The system of claim 15, wherein the at least one replacement frame comprises only binary one values.

21. The system of claim 15, further comprising:

a module for receiving jittered AAL1 cells;

a module extracting data from the jittered AAL1 cells to form a jittered frame;

a module for adding the jittered frame to the buffer after the replacement frame; and a module for making the jittered frame available to be read by the reader after the replacement frame.

22. The system of claim 15, wherein the optimal fullness level value is zero.

23. The method of claim 1, further wherein the first indicator is initially set to a value higher than a size of the buffer.

24. A system for reducing jitter associated with AAL1 cells, comprising:

means for providing a first-in-first-out buffer for buffering frames containing data extracted from the AAL1 cells, the buffer having a first port for writing frames to the buffer and a second port for reading frames from the buffer;

means for reading frames from the second port at regular time intervals;

means for inserting, when a frame is not available to be read from the buffer by the reader, at least one replacement frame into the buffer and making the replacement frame available to be read by the reader through the second port of the buffer.

25. The system of claim 24, further comprising:

means for periodically determining a current fullness level of the buffer and setting a first indicator to the current fullness level if the current fullness level is less than the first indicator value;

means for comparing the value of the first indicator to an optimal fullness level value; and means for skipping a first number of frames from the buffer at the second port to reduce the average buffer fullness level value for the buffer when the value of the first indicator is greater than the optimal fullness level value.

* * * * *